(12) United States Patent
Shigeeda

(10) Patent No.: US 6,212,499 B1
(45) Date of Patent: Apr. 3, 2001

(54) AUDIBLE LANGUAGE RECOGNITION BY SUCCESSIVE VOCABULARY REDUCTION

(75) Inventor: Nobuyuki Shigeeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/401,651

(22) Filed: Sep. 23, 1999

(30) Foreign Application Priority Data

Sep. 25, 1998 (JP) .................................................. 10-287343

(51) Int. Cl.[7] .............................. G10L 15/02; G10L 15/00
(52) U.S. Cl. .......................... 704/254; 704/251; 704/252; 704/231
(58) Field of Search .................................... 704/249, 251, 704/270, 275, 254, 231

(56) References Cited

U.S. PATENT DOCUMENTS

| | | | |
|---|---|---|---|
| 4,618,984 | * 10/1986 | Das et al. | 704/244 |
| 5,832,428 | * 11/1998 | Chow et al. | 704/255 |
| 5,832,429 | * 11/1998 | Gammel et al. | 704/255 |
| 6,014,624 | * 1/2000 | Raman | 704/243 |

OTHER PUBLICATIONS

"Dragon Dictate User's Guide", Dragon Systems, Inc., Copyright 1986–1996, First edition 1996b.*

* cited by examiner

Primary Examiner—Richemond Dorvil
Assistant Examiner—Daniel A. Nolan
(74) Attorney, Agent, or Firm—Fitzpatrick, Cella, Harper & Scinto

(57) ABSTRACT

A syllable or phoneme at the beginning of a word input by voice is subjected to voice recognition. Using the recognized syllable or phoneme as a key, applicable data is retrieved from a plurality of groups of vocabulary data established in advance. The retrieved vocabulary data is displayed to notify the operator of the data. If only one item of vocabulary data has been retrieved, predetermined processing is activated based upon the content of the vocabulary data. If the retrieved vocabulary data is plural in number, then the plural items of vocabulary data are placed in a population that is to undergo search and retrieval next, and retrieval based upon the next syllable or phoneme is carried out.

23 Claims, 3 Drawing Sheets

AUDIBLE LANGUAGE RECOGNITION BY SUCCESSIVE VOCABULARY REDUCTION

BACKGROUND OF THE INVENTION

1. Field of the Invention

This invention relates to a data retrieval apparatus, a data retrieval method and a storage medium therefor, and a communications apparatus. More particularly, the invention relates to a voice-based data retrieval apparatus having a voice recognition function, a data retrieval method applied to this apparatus, a storage medium storing a program that executes the data retrieval method, and a communications apparatus based upon this data retrieval.

2. Description of the Related Art

In order to specify the number of a party to be called from communications equipment such as a telephone or facsimile machine, the user is required to perform a manual operation, such as the pressing of dialing keys, numeric keys or registration keys provided on an equipment control panel. In the case of registration keys, the number thereof can reach several dozen to several hundred, and searching for the desired key can be a time-consuming operation. Further, such communications equipment is becoming increasingly complicated owing to the presence of a large number of operating keys, and operating a control panel that involves operating these keys is difficult for an operator who is not accustomed to operating the equipment.

Retrieval of registered information in such communications equipment and operation of the equipment have been facilitated in part by applying voice recognition and voice synthesis now being developed. Specifically, by using voice to designate the name of a party to be called, a number registered in advance is retrieved automatically to make the call. In a situation where the name of the party to be called has not been registered, the telephone number of the party may be specified by voice directly. If this is done, the communications equipment is capable of recognizing the number and of calling the number specified.

A wide variety of voice-recognition algorithms are currently available and improvements in these algorithms have led to the application of voice recognition and synthesis technology to various equipment. This is making it easier for the operator to operate such equipment. Specifically, with present-day communications equipment having a voice recognition function, the calling party pronounces a predetermined number or a registered name by voice that is recognized by the equipment. This makes it unnecessary for the operator to perform a complicated key operation using the control panel of the equipment.

However, when it is attempted to raise the voice recognition rate by accurately discriminating the voice of the operator from ambient noise and, at the same time, to make it possible to recognize the voice of an unspecified speaker, this results in the need for a complex voice-recognition algorithm and large-capacity voice dictionary as a database for voice recognition. As a consequence, a very large memory capacity is required for the equipment-control memory and database memory, thereby raising the cost of the equipment.

Though it is possible to reduce the required memory capacity by simplifying the voice recognition algorithm and scaling down the size of the voice dictionary, this is disadvantageous in that is raises the probability that the input voice will be recognized incorrectly. If the equipment misrecognizes the voice, it is necessary to input voice again or to correct the content of the input by operating keys on the control panel. Inputting the required information takes time.

SUMMARY OF THE INVENTION

Accordingly, an object of the present invention is to provide a data-retrieval apparatus, a data-retrieval method and storage medium therefor, and a communications apparatus capable of improving operability, inclusive of shortening operating time, and of holding down increases in manufacturing cost.

According to the present invention, the foregoing object is attained by providing a data-retrieval apparatus having a voice-recognition function, comprising: voice-recognition means for subjecting a syllable or phoneme at the beginning of an input voiced word to voice recognition; data-retrieval means for retrieving, from a plurality of groups of vocabulary data set in advance, applicable vocabulary data using the syllable or phoneme recognized by the voice-recognition means; and display means for displaying the vocabulary data retrieved by the data-retrieval means, thereby notifying an operator of the vocabulary data.

Further, in accordance with the present invention, there is provided a data-retrieval method applied to a data-retrieval apparatus having a voice-recognition function, comprising: a voice-recognition step of subjecting a syllable or phoneme at the beginning of an input voiced word to voice recognition; a data-retrieval step of retrieving, from a plurality of groups of vocabulary data set in advance, applicable vocabulary data using the syllable or phoneme recognized at the voice-recognition step; and a display step of displaying the vocabulary data-retrieved at the data-retrieval step, thereby notifying an operator of the vocabulary data.

Further, in accordance with the present invention, there is provided a data-retrieval apparatus comprising: input means for inputting voice; storage means for storing a plurality of data groups in units of syllables or phonemes at the beginning of the data; recognition means for recognizing a syllable or phoneme at the beginning of the voice that has been input; and means for retrieving, from the storage means, data belonging to a group corresponding to the syllable or phoneme recognized by the recognition means.

Further, in accordance with the present invention, there is provided a communications apparatus comprising: input means for inputting voice; storage means for storing a plurality of items of destination data grouped in units of syllables or phonemes; recognition means for recognizing a syllable or phoneme at the beginning of the voice that has been input; and means for retrieving, from the storage means, destination data belonging to a group corresponding to the syllable or phoneme recognized by the recognition means.

Further, in accordance with the present invention, there is provided a computer-readable storage medium storing, as a program, a data-retrieval method applied to a data-retrieval apparatus having a voice-recognition function, the data-retrieval method comprising: a voice-recognition step of subjecting a syllable or phoneme at the beginning of an input voiced word to voice recognition; a data-retrieval step of retrieving, from a plurality of groups of vocabulary data set in advance, applicable vocabulary data using the syllable or phoneme recognized at the voice-recognition step; and a display step of displaying the vocabulary data retrieved at the data retrieval step, thereby notifying an operator of the vocabulary data.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described with reference to the drawings.

Figure 1:
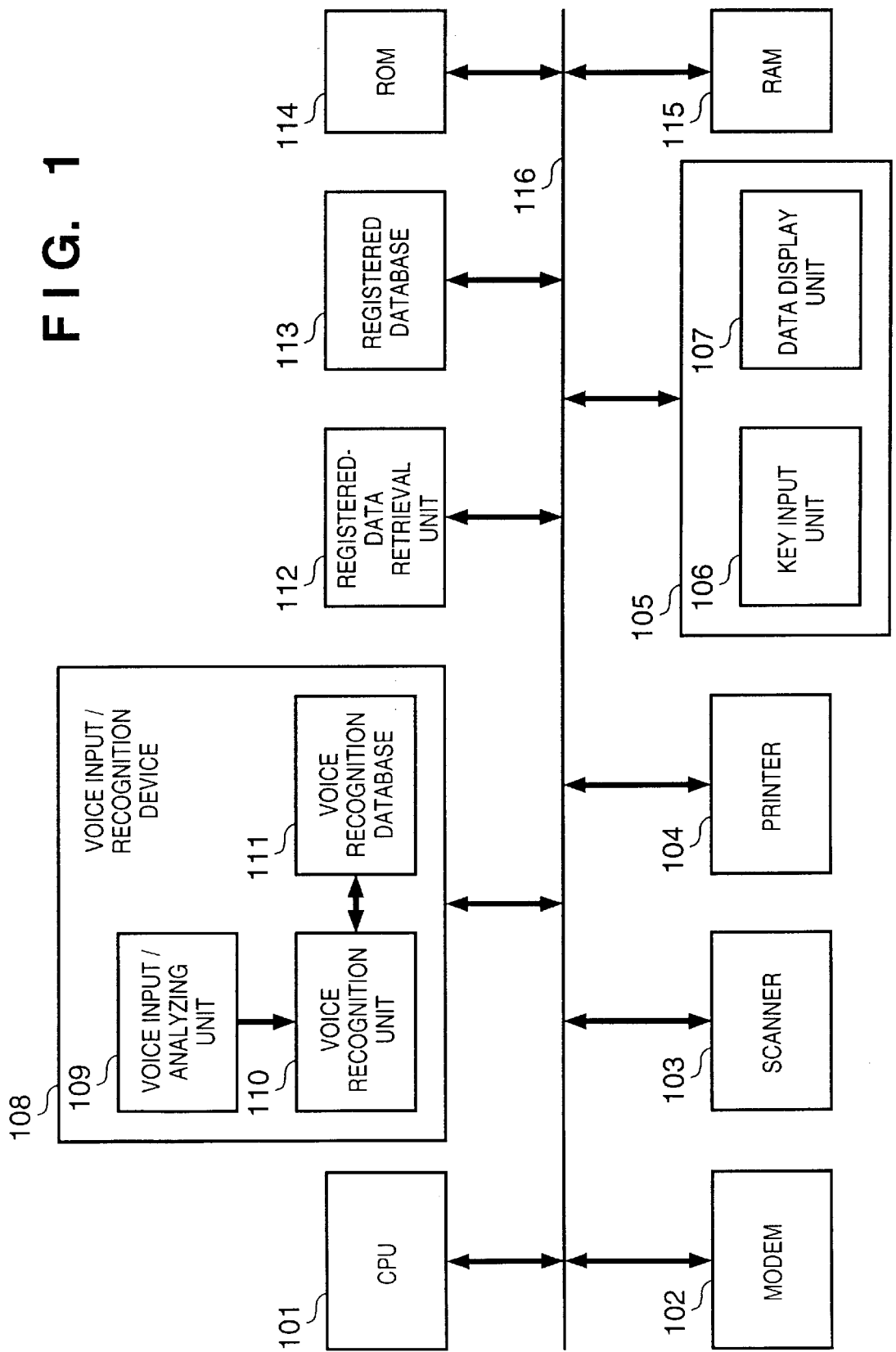
FIG. 1 is a block diagram illustrating the construction of communications equipment having a voice-recognition function, the equipment representing an embodiment of a data-retrieval apparatus according to the present invention.

FIG. 1 is a block diagram illustrating the construction of communications equipment having a voice-recognition function. This equipment represents an embodiment of a data-retrieval apparatus according to the present invention.

As shown in FIG. 1, the apparatus includes a CPU 101, which exercises centralized control of apparatus operation and data processing; a modem 102 for modulating and demodulating data at the time of a facsimile transmission; and a scanner 103, which includes a mechanism for reading a document to convert the document to electronic data. For example, the scanner 103, which comprises reducing optics using a CCD and a mechanism for performing a data correction (neither of which are shown), subjects the read image data to a shading correction and an automatic correction of background density. A printer 104 is capable of printing out directly the image that has been read and processed by the scanner 103. When a faxed image is received, the printer 104 is capable also of printing out the faxed image upon subjecting it to a predetermined resolution conversion. The communications apparatus in this embodiment has a digital copying function as well and therefore reads multilevel image data read by the scanner 103, converts this data to binary data, and prints out the image using the printer 104.

The apparatus further includes a key-input unit 106 for inputting data manually, and a data display unit 107 for displaying input data and information as well as the results of retrieval by voice recognition, described later. The key input unit 106 and data display unit 107 are disposed on the front or top side of the apparatus as an ordinary control panel 105. Though the construction of the embodiment shown in FIG. 1 is such that the key input unit 106 and data-display unit 107 are provided separately of each other, an arrangement may be adopted in which the display unit and data-input unit are integrated as a single device in the manner of, say, a touch-sensitive panel. In such case it would be unnecessary to provide the control panel 105 with mechanical keys, thereby making it possible to enhance the operability of the equipment and to obtain a more attractive design. The apparatus further includes a voice input/ recognition device 108, which provides the core functions of the present embodiment. The details of the voice input/ recognition device 108 will be described later. The apparatus further includes a registered-data retrieval unit 112 for retrieving registered data from a registered database 113. The details will be described later. A ROM 114 stores various programs, which are executed by the CPU 101, and permanent data. A RAM 115 provides a work area for temporarily saving data to be subjected to various processing as well as the results of processing.

The components mentioned above are interconnected via an address bus and data bus 116 and are controlled by the CPU 101.

The voice input/recognition device 108 comprises a voice input/analyzing unit 109, a voice-recognition unit 110 and a voice-recognition database 111. The voice input/analyzing unit 109 is divided into a voice input section and a sound analyzing unit, neither of which are shown. An example of the voice input section that can be mentioned is a microphone. In order to improve the voice-recognition function by suppressing noise components and emphasizing voice components in the voice waveform, the voice-input section can be constructed from a directional microphone or a microphone array, etc. The sound-analyzing section, on the other hand, includes various mechanisms for splitting an input voice signal into prescribed subframes and eliminating a noise pattern contained in these frames. Noise is assumed to be sound applied in steady-state fashion, such as the sound of air conditioning in an office or the sound in a traveling vehicle. According to this embodiment, noise of this kind is eliminated using a method that includes periodically sampling a sound spectrum pattern as a noise spectrum prior to a voice input and, when voice is input, subtracting the noise spectrum from the spectrum pattern of the input voice in the presence of noise. A fast-Fourier transform (FFT) can be used to perform spectrum analysis in each frame. In order to implement this, software signal processing may be used or it is possible to adopt an ASIC (Application-Specific Integrated Circuit) that uses a DSP core. Further, joint use may be made of prescribed filtering means for the purpose of removing noise components. The filtering means, which eliminates frequency components that are outside the band of frequencies of sounds capable of being pronounced by human beings, may comprise a high-pass filter, a band-pass filter, etc.

The sound data that has been split into subframes via the voice input/analyzing unit 109 enters the voice-recognition unit 110. It is possible to divide the voice-recognition unit 110 into a phoneme recognition section and a word-recognition section. On the basis of a phoneme model prepared in advance, the phoneme-recognition section subjects the frequency spectrum of each subframe to comparison and checking to specify phonemes while taking a change with time into consideration. Ordinarily the frequency spectrum of a voice sound wave has a plurality of peaks and it is generally known that the frequencies at these peaks and a change in the peaks with time are important in the recognition of vowels and consonants in the sound wave. In this embodiment, vowels and consonants, namely phonemes, are distinguished based upon the features and change with time of the frequency spectrum in the subframes. Though identification of accent and intonation in speech is an important factor in voice recognition, the present embodiment goes no farther than simply recognizing syllables at the beginning of words. Identification of accent and intonation, therefore, is not necessary in this embodiment. As a result, in comparison with voice recognition according to the prior art, a higher processing speed can be achieved and the amount of memory necessary for the database can be reduced by a wide margin.

The word-recognition section in the voice-recognition unit 110 compares and checks a specified phoneme model and word model that has been registered in advance, thereby calculating the frequency with which the two agree and identifying the word. Models that take into consideration the transformation of syllables in a word, such as unvoiced vowels, elongation of vowels, nasalization of vowels and palatalization of consonants, are prepared as the word models. In the present embodiment, it will suffice to prepare word models sufficient for recognizing syllables, for example, the 51 sounds ("a" to "n") of syllables in the Japanese language. In general, in order to recognize a word as a character string having meaning, it is necessary to prepare a correspondingly large number of word models and this necessitates reserving a correspondingly large memory area. According to the present embodiment, however, words in the form of character strings having meaning are not recognized. The embodiment is characterized in that only syllables at the beginning of pronounced words are recognized and used in retrieval of registered data, described later. As a result, the memory area for word models can be made very small in comparison with the prior art. This has the major advantage of raising processing speed and lowering cost.

It should be noted that the phoneme models and word models described earlier may be retained along with the voice-recognition database 111 shown in FIG. 1. Since the amount of data in each model is small, an arrangement may be adopted in which the voice input/analyzing unit 109 and voice-recognition unit 110 each retain the data. It is possible to implement the voice-recognition database 111 using a data storage device such as a ROM, RAM or hard disk.

A word that has undergone voice-recognition via the voice input/recognition device 108 is applied to the registered-data retrieval unit 112, described later, upon being stored temporarily in the work area of RAM 115.

The registered data in the registered-data retrieval unit 112 is composed of frequently specified telephone numbers and predetermined names associated therewith. The registered-data retrieval unit 112 in this embodiment provides a function which, on the basis of an abbreviated name registered in advance, retrieves the applicable telephone number. The registered data is stored in the registered database 113 as information in which telephone numbers and abbreviated names are associated. The registered database usually is implemented by a RAM or hard disk, etc. The number of items of data capable of being registered is increased or decreased in dependence upon the capacity of the registered database 113.

In this embodiment, the voice-recognition database 111 and registered database 113 are described as being separate entities, as illustrated in FIG. 1. However, it will suffice if these exist as logically independent functions and, in terms of hardware, they may be integrated as a single item of hardware. Further, in this embodiment, telephone numbers and their abbreviated names are mentioned as the registered data. However, the present embodiment is applicable also in a case where the extensions of the equipment are increased. For example, it is possible to register Internet addresses and mail addresses as well.

Further, in FIG. 1, the voice input/recognition device 108 is shown as being independent of the other components. However, processing programs corresponding to the analysis processing of the voice input/analyzing unit 109 and the recognition processing of the voice recognition unit 110 can be stored in the ROM 114 beforehand and these programs can be executed by the CPU 101 to thereby implement some of the functions of the voice input/analyzing unit 109 and voice-recognition unit 110. In addition, a hard disk or CD may be utilized instead of the ROM 114 as the memory for storing the programs.

The operation of the embodiment constructed as set forth above will now be described.

Figure 2:
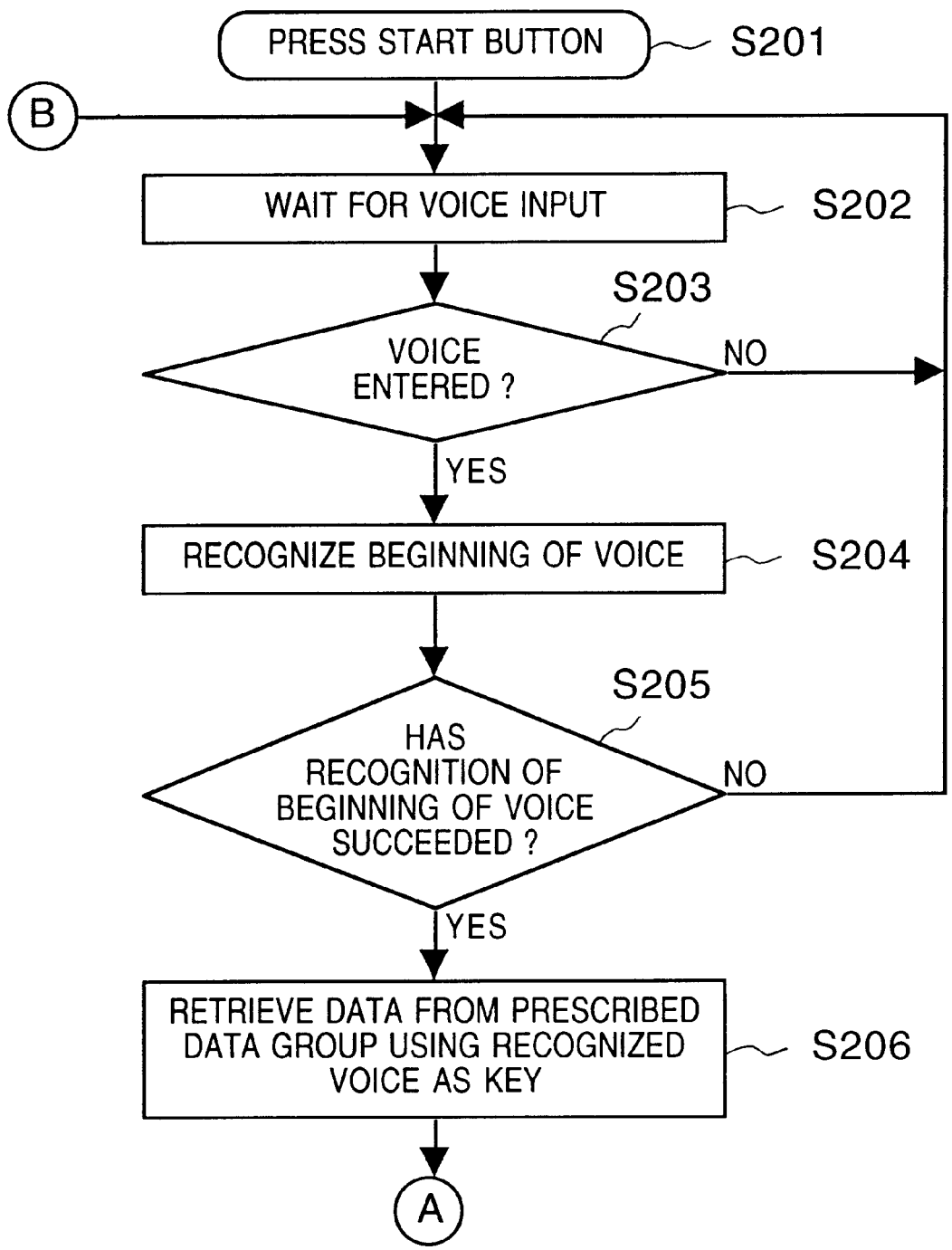
FIG. 2 is a control flowchart illustrating a characterizing operation of this embodiment.
Figure 3:
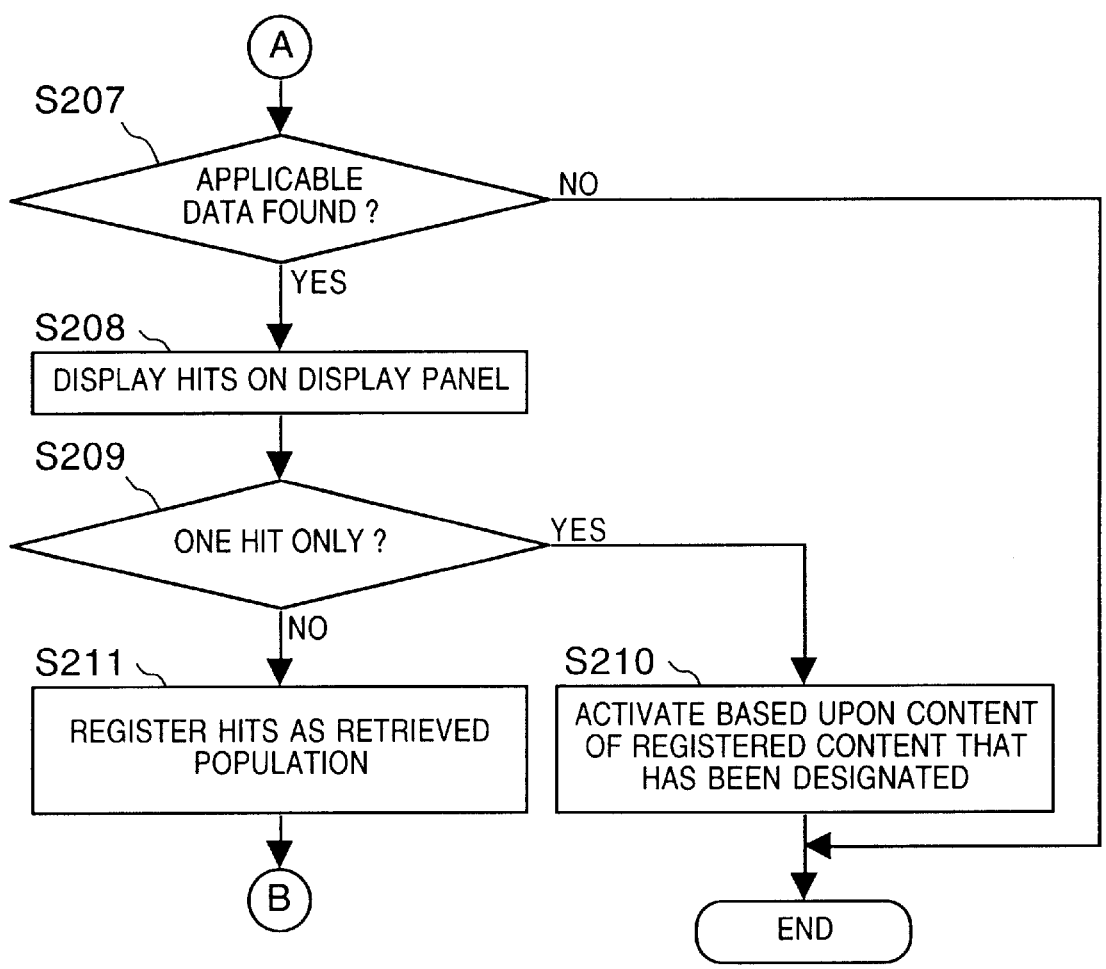
FIG. 3 is a control flowchart illustrating a characterizing operation of this embodiment.

FIGS. 2 and 3 are control flowcharts illustrating the operation characterizing the present embodiment.

When an operator originates a call using a conventional facsimile machine or telephone, the operator first presses keys to designate the telephone of the party to be called or presses a registered key that has been registered in advance and then presses a start key. According to the present embodiment, however, the first action performed by the operator is to press the start key (S201). This is to provide the equipment with the timing at which voice recognition is to begin. In order to eliminate noise from the voice signal, the voice input/analyzing unit 109, in the manner described above, temporarily samples the sound spectrum pattern prior to the voice input as a noise spectrum and, when voice has been input, subtracts the noise spectrum from the spectrum pattern of the input voice in the presence of noise. This means that the noise data prior to the voice input and the voice to be recognized must be distinguished from each other. Accordingly, step S201, which calls for pressing of the start button, is pressed. This is taken as the starting point at which voice recognition begins.

Pressing the start button causes the voice input/analyzing unit 109 of FIG. 1 to make a transition to step S202, where it waits for a voice input. Here a software task for detecting a voice input is activated. Then, at step S203 in FIG. 2, whether or not there is a voice input is sensed independently of other equipment-control tasks. If there is no voice input ("NO" at S203), control returns to step S202, where the unit 109 waits for an input again. If there is a voice input from the operator ("YES" at S203), then control proceeds to step S204, which is for recognizing the beginning part of the voice input.

As described above in connection with the voice input/ recognition device 108 of FIG. 1, voice input at the beginning of a word pronounced by the operator is recognized through a predetermined process. More specifically, words and phrases pronounced by the operator are not recognized as character strings having meaning. Rather, only syllables at the beginning of pronounced words are recognized. As a result, the processing time required at the voice-recognition step S204 is shortened in comparison with ordinary-word recognition processing.

Present-day voice recognition technology is still under development and there are also cases where, depending upon the environment in which the equipment is used, the amount of noise is extremely great. All voice inputs, therefore, cannot necessarily be recognized. There are instances where voice inputs are recognized incorrectly or not at all with a certain probability. In such situations the operator is requested to input voice again, the apparatus waits for the voice input from the operator and then re-executes voice recognition. In the present embodiment also, success/failure of recognition of a voiced word is determined at step S205 after the recognition step S204 is executed. The operator is requested to input voice again in case of failure. More specifically, if the result of comparison with the prescribed phoneme model or word model performed at step S204 is that recognition has failed ("NO" at S205), it is judged that the beginning of the word cannot be identified. As a result, control returns from step S205 to step S202, where a voice input from the operator is awaited again. Concurrently, a message requesting a voice input from the operator again is displayed on the data display unit 107.

If voice recognition at step S204 has succeeded, ("YES" at S205), control proceeds to step S206, at which data is searched for in a prescribed data group based upon the beginning of the word recognized. The prescribed data group is data that has been registered and stored in the registered database 113 of FIG. 1. The database includes a plurality of data groups in units of syllables of phonemes at the beginning of the data in ascending or descending order of syllables or phonemes. Accordingly, when the data search is carried out at step S206, the beginning of the word obtained by the voice input/recognition device 108 is adopted as key data and all data included in the data group that matches the key data is selected from the database and output. Control proceeds to step S208 if matching data is found. If matching data is not found, the data retrieval routine based upon voice is exited.

Step S208 is for displaying hits (matching data) on the data display unit 107. If there are a plurality of hits, all of these are displayed on the data display unit 107. In a case where the number of hits is so large that they cannot be displayed at one time, some of the hits are displayed along with a message indicating that there are more hits. If there is only one hit, control proceeds to step S210 immediately. Here the apparatus responds based upon the registered content that has been designated. In other words, if the kind of registered content is identified as telephone number, the method starts an operation of calling and then an outgoing call is placed to this telephone number. On the other hand, if the kind of the registered content is identified as a mail address, the method starts a mailing operation and then the mail is transmitted to the mail address.

In a case where a plurality of matching data have been retrieved at step S206, these data are displayed on the data display unit 107, as mentioned above. The results of retrieval of these plurality of data are registered as a retrieved population in the present search job at step S211, after which control returns to the voice-input waiting step S202 in order that input of a second syllable may be accepted. At the beginning of the search job, all data that has been registered in the registered database 113 is searched. Once a search has been conducted, however, a plurality of data selected as a result serve as a population in the database the next time the search is conducted. When the second syllable is entered, the syllable is recognized at step S204 and data that matches this recognized second syllable is retrieved from the preceding hits. Thereafter, in similar fashion, retrieval based upon syllables from the third syllable onward is performed using the preceding hits as the object of the next search. By executing processing in this manner, input of voice and retrieval of data are repeated and it is possible to conduct a gradual narrowing-down search among a large number of registered data in such a manner that the registered data sought will be left.

In a case where a plurality of data have been selected based upon the hits obtained at step S206, these results are displayed on the data display unit 107, as set forth above. At the same time, however, a task (not shown) is launched to accept a manual selection in regard to a plurality of hits. This task, which is independent of the task for voice-based data retrieval, is for accepting a selection of registered data made manually at an arbitrary timing. In a case where the desired registered data has been found from registered data that was narrowed down, the operator operates the key input unit 106 in FIG. 1 to manually select the registered data. The above-mentioned task accepts this selection, halts the retrieval operation and activates processing, such as call processing, on the basis of the selected data.

Thus, registered data that is desired is narrowed down from a large number of items of registered data obtained by repeated voice retrieval. If, during the course of this narrowing-down processing, the operator finds the desired registered data on the screen of the data display unit 107, this data can be designated manually. Accordingly, the operator need not continue voice-based retrieval until one desired hit finally appears. This makes it possible to perform the data selection at higher speed. In addition, there are comparatively fewer instances where data retrieval takes more time than would otherwise be the case owing to misrecognition of voice. This makes it possible to improve operability.

In the above-described embodiment, the user observes the results of retrieval, which are based upon the immediately preceding syllable, and then inputs the next syllable. However, an arrangement may be adopted in which the user collectively inputs a string of syllables constructing a desired word, stores this syllable string in a buffer provided in RAM 115, and performs retrieval by extracting one syllable at a time. In this case, the results of retrieval based upon one syllable are displayed. If selection of registered data being displayed is not made within a fixed period of time, the next syllable is extracted to perform retrieval. Further, an arrangement may be adopted in which continuation of retrieval can be specified by operating a specific key. Furthermore, an arrangement may be adopted in which extraction and retrieval are performed using phonemes as the units instead of syllables. In this case, the beginning of voice recognized in step S204 is the first phoneme included in the voice.

Further, with the usual facsimile machine or telephone, the number of destinations that can be registered is on the order of several dozen, and the number of destinations actually registered is even less. In such a case where the number of items of data that may possibly be registered is not that great, even if a plurality of destinations having the same leading syllable or phoneme are retrieved, the number thereof will be small and it should be easy to select the desired destination from the results of retrieval displayed. With this apparatus, therefore, the narrowing down of registered data in a search need not be performed at all; the results of retrieval based upon the leading syllable or phoneme may simply be displayed, after which retrieval may be terminated. This simplifies the program and the structure of data necessary for retrieval. In this case the user would input the word of a destination name and only the syllable or phoneme at the beginning of the word would be recognized on the side of the apparatus.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, a hard disk, an optical disk, magneto-optical disk, CD-ROM, CD-R, a magnetic tape, a non-volatile type memory card or ROM can be used to provide the program codes.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Thus, according to the present embodiment as described above, the syllable at the beginning of a voice input is subjected to voice recognition, the syllable recognized at the beginning of the voice input is used as a key to retrieve the applicable vocabulary data group from a plurality of vocabulary-data groups set in advance, and the vocabulary data included in a retrieved vocabulary data group are displayed to notify the operator. This makes it possible to improve operability, inclusive of shortening the operating time, and to hold down increases in manufacturing cost.

More specifically, the large number of word models and language models necessary in conventional voice recognition are reduced by a wide margin or dispensed with. By combining some of the functions of voice recognition and a data retrieval function, it is possible to provide a data-retrieval apparatus which is low in cost and outstanding in terms of operability. Among the usual voice-recognition functions available, character recognition in particular is eliminated. In the word-recognition function, recognition of meaningful words is not carried out, and the embodiment focuses on a function for recognizing syllables or phonemes. This means that a smaller storage area for the database suffices. Furthermore, high-speed processing is realized by simplifying the complicated voice-recognition algorithm used in the prior art. In a case where the present invention is applied to communications equipment such as a facsimile machine, the several dozen to several hundred registration keys necessary with conventional facsimile communications equipment are dispensed with by retrieving and designating registered data by voice input. This lowers equipment cost and improves equipment operability.

As many apparently widely different embodiments of the present invention can be made without departing from the spirit and scope thereof, it is to be understood that the invention is not limited to the specific embodiments thereof except as defined in the appended claims.

What is claimed is:

1. A data retrieval apparatus having a voice recognition function, comprising:
   voice recognition means for subjecting a syllable or phoneme positioned at the head of an input voiced word to voice recognition;
   data retrieval means for retrieving, from a plurality of groups of vocabulary data set in advance, vocabulary data including at the head thereof the syllable or phoneme recognized by said voice recognition means; and
   display means for displaying the vocabulary data retrieved by said data retrieval means, thereby notifying an operation of the retrieved vocabulary data.

2. The apparatus according to claim 1, further comprising voice input/analyzing means for converting input voice to an electrical signal, removing noise components from the electrical signal and outputting the electrical signal to said voice recognition means.

3. The apparatus according to claim 2, further comprising sensing means for sensing the noise components based upon input sound which prevails prior to start of operation commanded by the operator.

4. The apparatus according to claim 1, further comprising activation means for activating predetermined processing based upon content of the vocabulary data, which has been retrieved by said data retrieval means, in a case where the vocabulary data retrieved is only a single item.

5. The apparatus according to claim 1, further comprising control means which, in a case where the vocabulary data that has been retrieved by said data retrieval means is plural in number, sets these plural items of vocabulary data in a population that is the object of ensuing retrieval, causes said voice recognition means to recognize an ensuing syllable or phoneme, and causes said data retrieval means to perform retrieval based upon the ensuing syllable or phoneme.

6. The apparatus according to claim 5, further comprising halting means for immediately halting the retrieval operation, which said control means causes said data retrieval means to perform, in a case where the vocabulary data displayed on said display means is plural in number and one of these plural items of vocabulary data has been designated by the operator.

7. The apparatus according to claim 5, further comprising activation means which, in a case where the vocabulary data displayed by said display means is plural in number and one of these plural items of vocabulary data has been designated by the operator, activates predetermined processing based upon content of the vocabulary data that has been designated.

8. The apparatus according to claim 5, wherein said voice recognition means recognizes voice in syllable units and recognizes, as an ensuing syllable, voice that has been input after display of the vocabulary data by said display means.

9. The apparatus according to claim 5, further comprising word storage means for storing a word that has been input by voice;
   wherein said voice recognition means successively extracts and recognizes syllables or phonemes from said word storage means.

10. A data retrieval method applied to a data retrieval apparatus having a voice recognition function, comprising:
    a voice recognition step of subjecting a syllable or phoneme positioned at the head of an input voiced word to voice recognition;
    a data retrieval step of retrieving, from a plurality of groups of vocabulary data set in advance, vocabulary data including at the head thereof the syllable or phoneme recognized at said voice recognition step; and
    a display step of displaying the vocabulary data retrieved at said data retrieval step, thereby notifying an operator of the retrieved vocabulary data.

11. The method according to claim 10, further comprising a voice input/analyzing step of converting input voice to an electrical signal, removing noise components from the electrical signal and making the electrical signal available for processing at said voice recognition step.

12. The method according to claim 11, further comprising a sensing step of sensing the noise components based upon input sound which prevails prior to the start of operation commanded by the operator.

13. The method according to claim 10, further comprising an activation step of activating predetermined processing based upon content of the vocabulary data, which has been retrieved at said data retrieval step, in a case where the vocabulary data retrieved is only a single item.

14. The method according to claim 10, wherein in a case where the vocabulary data that has been retrieved at said data retrieval step is plural in number, these plural items of vocabulary data are set in a population that is the object of ensuing retrieval, an ensuing syllable or phoneme is recognized at said voice recognition step, and retrieval based upon the ensuing syllable or phoneme is performed at said data retrieval step.

15. The method according to claim 14, further comprising a halting step of immediately halting the retrieval operation of said data retrieval step in a case where the vocabulary data displayed at said display step is plural in number and one of these plural items of vocabulary data has been designated by the operator.

16. The method according to claim 14, further comprising an activation step which, in a case where the vocabulary data displayed at said display step is plural in number and one of these plural items of vocabulary data has been designated by the operator, activates predetermined processing based upon content of the vocabulary data that has been designated.

17. The method according to claim 14, wherein said voice recognition step recognizes voice in syllable units and recognizes, as an ensuing syllable, voice that has been input after display of the vocabulary data at said display step.

18. The method according to claim 14, further comprising a word storage step of storing, in a word memory, a word that has been input by voice;

wherein said voice recognition step successively extracts and recognizes syllables or phonemes from said word memory.

19. A computer-readable storage medium storing, as a program, a data retrieval method applied to a data-retrieval apparatus having a voice recognition function, said data retrieval method comprising:

a voice recognition step of subjecting a syllable or phoneme positioned at the head of an input voiced word to voice recognition;

a data retrieval step of retrieving, from a plurality of groups of vocabulary data set in advance, vocabulary data including at the head thereof the syllable or phoneme recognized at said voice recognition step; and a display step of displaying the vocabulary data retrieved at said data retrieval step, thereby notifying an operator of the retrieved vocabulary data.

20. The storage medium according to claim 19, wherein said data retrieval method further comprises an activation step of activating predetermined processing based upon content of the vocabulary data, which has been retrieved at said data retrieval step, in a case where the vocabulary data retrieved is only a single item.

21. The storage medium according to claim 19, wherein said data retrieval method in such that in a case where the vocabulary data that has been retrieved at said data retrieval step is plural in number, these plural items of vocabulary data are set in a population that is the object of ensuing retrieval, an ensuing syllable or phoneme is recognized at said voice recognition step, and retrieval based upon the ensuing syllable or phoneme is performed at said data retrieval step.

22. A data retrieval apparatus comprising:

input means for inputting voice;

storage means for storing a plurality of data groups in units of syllables or phonemes at the head of the data;

recognition means for recognizing a syllable or phoneme positioned at the head of the voice that has been input; and means for retrieving, from said storage means, data belonging to a group corresponding to the syllable or phoneme recognized by said recognition means.

23. A communications apparatus comprising:

input means for inputting voice;

storage means for storing a plurality of items of destination data grouped in units of syllables or phonemes;

recognition means for recognizing a syllable or phoneme positioned at the head of the voice that has been input; and means for retrieving, from said storage means, destination data belonging to a group corresponding to the syllable or phoneme recognized by said recognition means.

* * * * *

UNITED STATES PATENT AND TRADEMARK OFFICE
CERTIFICATE OF CORRECTION

PATENT NO. : 6,212,499 B1
DATED : April 3, 2001
INVENTOR(S) : Nobuyuki Shigeeda

It is certified that error appears in the above-identified patent and that said Letters Patent is hereby corrected as shown below:

Column 1,
Line 65, "is" should read -- it --.

Column 2,
Line 31, "data-retrieved" should read -- data retrieved --.

Column 3,
Line 46, "data display" should read -- data-display --.
Line 49, "data display" should read -- data-display --.
Line 52, "key input" should read -- key-input --.

Column 4,
Line 18, "input" should read -- input- --
Line 42, "phoneme recognition" should read -- phoneme-recognition --.

Column 5,
Line 28, "voice-recognition" should read -- voice recognition --.
Line 61, "voice recognition" should read -- voice-recognition --.

Column 7,
Line 28, "of the" should read -- of --.

Column 8,
Line 65, "magneto-optical disk, CD-ROM," should read -- a magneto-optical disk, a CD-ROM, --.
Line 66, "CD-R," should read -- a CD-R, --.

UNITED STATES PATENT AND TRADEMARK OFFICE
CERTIFICATE OF CORRECTION

PATENT NO. : 6,212,499 B1
DATED : April 3, 2001
INVENTOR(S) : Nobuyuki Shigeeda

It is certified that error appears in the above-identified patent and that said Letters Patent is hereby corrected as shown below:

Column 9,
Line 21, "vocabulary data" should read -- vocabulary-data --.
Line 23, "vocabulary data" should read -- vocabulary-data --.

Column 12,
Line 13, "method in" should read -- method is --.

Signed and Sealed this

Ninth Day of April, 2002

Attest:

Attesting Officer

JAMES E. ROGAN
Director of the United States Patent and Trademark Office